United States Patent
Yih et al.

(10) Patent No.: US 7,702,680 B2
(45) Date of Patent: Apr. 20, 2010

(54) DOCUMENT SUMMARIZATION BY MAXIMIZING INFORMATIVE CONTENT WORDS

(75) Inventors: Wen-tau Yih, Redmond, WA (US); Joshua T. Goodman, Redmond, WA (US); Lucretia H. Vanderwende, Bellevue, WA (US); Hisami Suzuki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 225 days.

(21) Appl. No.: 11/591,937

(22) Filed: Nov. 2, 2006

(65) Prior Publication Data

US 2008/0109425 A1    May 8, 2008

(51) Int. Cl.
G06F 7/00 (2006.01)
G06F 17/30 (2006.01)
(52) U.S. Cl. .................................... 707/738; 707/750
(58) Field of Classification Search .................. 715/513, 715/247, 210, 256, 205, 267; 707/1, 3, 4, 707/6, 5, 102, 104.1; 704/9, 7
See application file for complete search history.

(56) References Cited

U.S. PATENT DOCUMENTS

| | | | | |
|---|---|---|---|---|
| 5,689,716 A | * | 11/1997 | Chen | 715/256 |
| 5,926,812 A | * | 7/1999 | Hilsenrath et al. | 707/5 |
| 6,154,737 A | * | 11/2000 | Inaba et al. | 707/3 |
| 6,374,271 B1 | * | 4/2002 | Shimizu et al. | 715/207 |
| 6,789,230 B2 | * | 9/2004 | Katariya et al. | 715/267 |
| 7,017,114 B2 | * | 3/2006 | Guo et al. | 715/247 |
| 7,251,781 B2 | * | 7/2007 | Batchilo et al. | 715/210 |
| 7,263,530 B2 | * | 8/2007 | Hu et al. | 707/102 |
| 7,519,529 B1 | * | 4/2009 | Horvitz | 704/7 |
| 2002/0052901 A1 | * | 5/2002 | Guo et al. | 707/531 |
| 2003/0130837 A1 | * | 7/2003 | Batchilo et al. | 704/9 |
| 2004/0210829 A1 | * | 10/2004 | Cristofari et al. | 715/501.1 |
| 2007/0016602 A1 | * | 1/2007 | McCool et al. | 707/102 |

OTHER PUBLICATIONS

"A Trainable Document Summarizer"; Julian Kupiec, Jan Pedersen, Francine Chen; ACM Press Proceeding of the 18th Annual International ACM SIGIR Conference on Research and Development in Information Retreival, 1995;CA.*
"Summarizing Text Documents: Sentence Selection and Evaluation Metrics"; Jade Goldstein, Mark Kantrowita, Vibhu Mittal, Jaime Carbonell; SIGI '99; ACM; CA.*

* cited by examiner

Primary Examiner—John E Breene
Assistant Examiner—Giovanna Colan
(74) Attorney, Agent, or Firm—Joseph R. Kelly; Westman, Champlin & Kelly, P.A.

(57) ABSTRACT

Document summarization is performed by scoring individual words in sentences in a document or document cluster. Sentences from the document or document cluster are selected to form a summary based on the scores of the words contained in those sentences.

13 Claims, 7 Drawing Sheets

DOCUMENT SUMMARIZATION BY MAXIMIZING INFORMATIVE CONTENT WORDS

BACKGROUND

Automatic document summarization is a process by which a document is fed to a computer or other processing device and a textual summary is generated for the document. Multi-document summarization is similar, except that a document set comprising a plurality of different documents (which is also referred to as a document cluster) is fed to the processing device and a summary is generated that summarizes the entire set of documents.

Document summarization, and especially multi-document summarization, is an increasingly important task. As document clusters grow larger, there is a greater need to summarize those documents in order to assist users. In some applications, the user needs to quickly find the most important information overall (in which case a generic summarization is helpful). In other applications, the user needs to quickly find information that is most relevant to the specific user (in which case a topic-focused summarization is helpful). Examples of applications where multi-document summarization can be helpful include news applications, email threads, blogs, reviews of various types, and information retrieval search results.

The discussion above is merely provided for general background information and is not intended to be used as an aid in determining the scope of the claimed subject matter.

SUMMARY

Document summarization is performed by scoring individual words in sentences in a document or document cluster. Sentences from the document or document cluster are selected to form a summary based on the scores of the words contained in those sentences.

The words can be scored based on word position information indicative of a position of the words within a document in which they are contained. Frequency information can also be used in addition to word position information in scoring the words.

In another embodiment, machine learning is implemented to learn how likely words are to occur in a reference generated summary. The machine learning is deployed to score words in the documents under analysis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
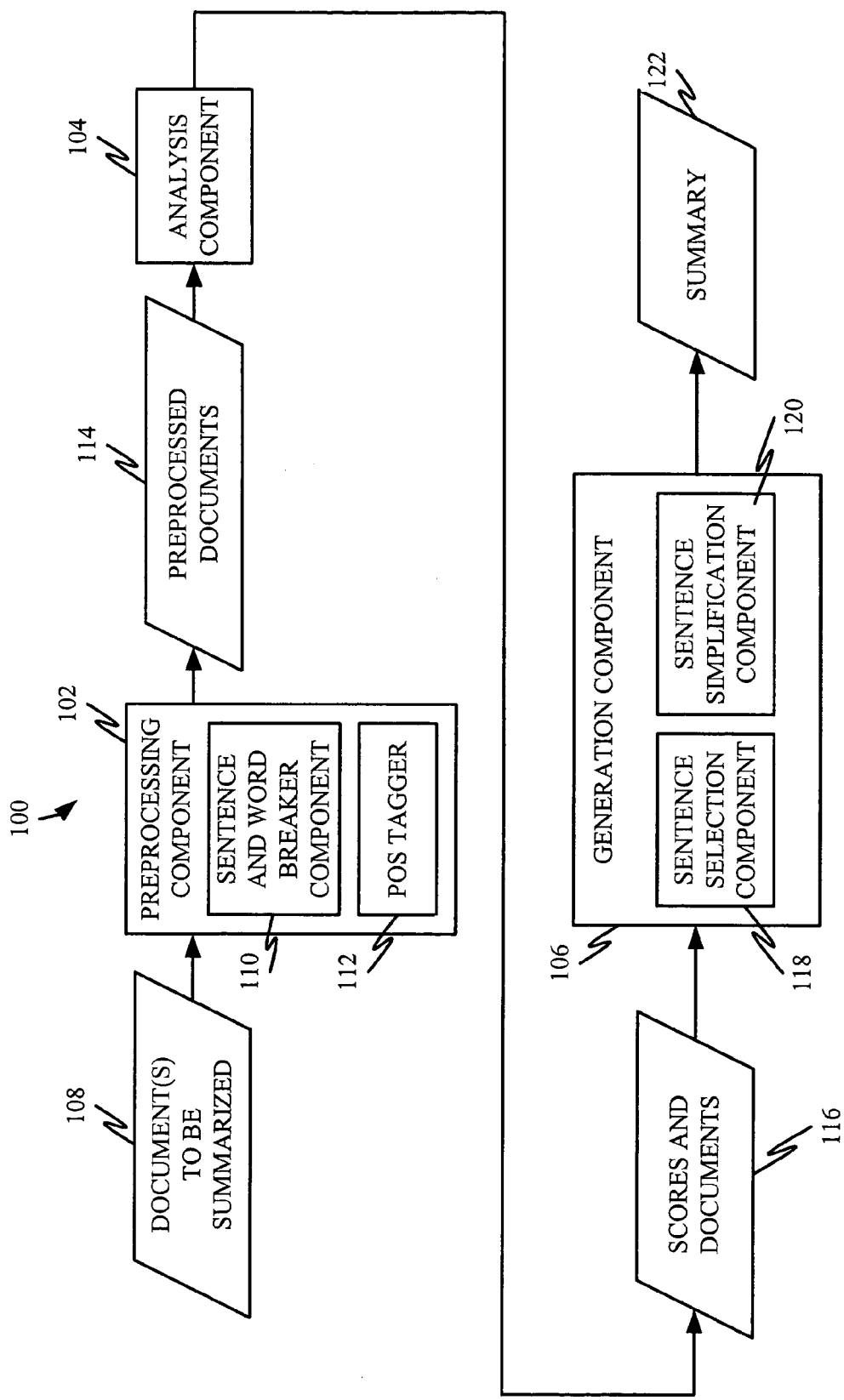
FIG. 1 is a block diagram of one illustrative system in which a summary is generated from a document cluster.

FIG. 1 is one illustrative embodiment of a document summarization system 100. Document summarization system 100 includes preprocessing component 102, analysis component 104, and generation component 106. System 100 is shown receiving one or more documents to be summarized. The documents to be summarized are indicated by block 108. While the present system can be used to summarize a single document, it will be described in terms of summarizing multiple documents (i.e., a document cluster) for the sake of the present discussion. This is exemplary only and is in no way intended to limit the system to summarizing multiple documents.

Figure 2:
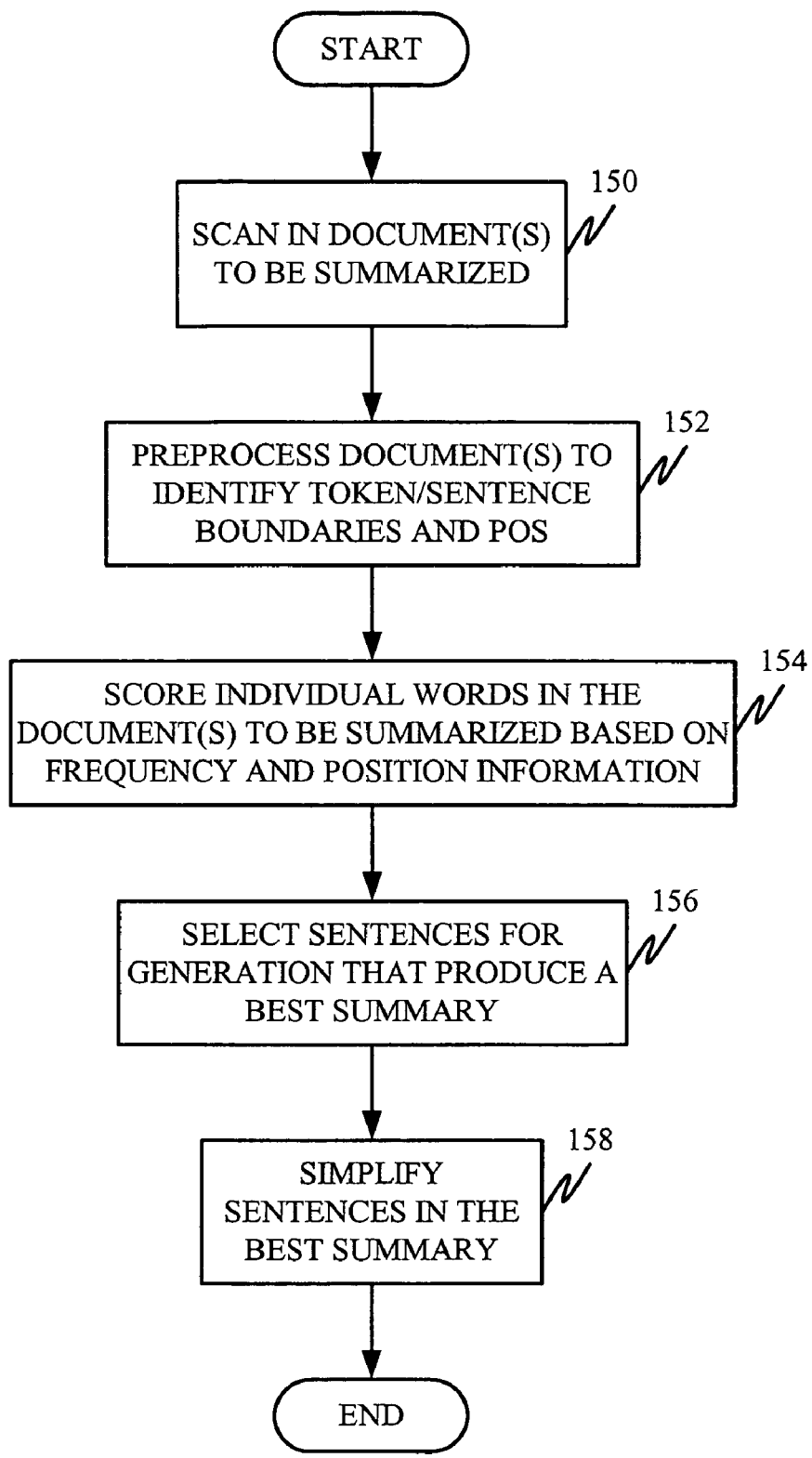
FIG. 2 is a flow diagram illustrating the overall operation of the system shown in FIG. 1.

FIG. 2 is a flow diagram showing one illustrative embodiment of the operation of system 100 in FIG. 1. Documents 108 are first scanned in or otherwise placed in an electronic format and read into system 100. This is indicated by block 150 in FIG. 2. Documents 108 are then preprocessed by preprocessing component 102. In the embodiment shown in FIG. 1, preprocessing component 102 includes sentence and word breaker component 110, along with part-of-speech (POS) tagger 112. Therefore, the documents 108 are broken into tokens (such as words or phrases) as well as sentences. Then, the parts of speech held by the words in each of the sentences are tagged by POS tagger 112.

The information output by preprocessing component 102 illustratively includes documents 108 with token (word or phrase) boundaries identified, along with POS tags for each of the words in the tokens. This information is identified as preprocessed documents 114 in FIG. 1. Preprocessing the documents is indicated by block 152 in FIG. 2.

Preprocessed documents 114 are provided to analysis component 104. Analysis component 104 illustratively uses machine learning to compute scores for each content token in the preprocessed document 114. The content token can be a content word or a phrase that contains a content word. The present discussion proceeds with respect to content words only, for the sake of example, but the invention is not so limited. The term content word will illustratively include phrases as well. Content words are identified based on the POS tags and may include, for example, nouns, verbs, adjectives and numbers, although other parts-of-speech can be deemed content words as well.

In one embodiment, analysis component 104 illustratively uses both frequency information and word position information in scoring the words. The frequency information is indicative of how frequently the words are used in the document cluster, while the word position information is indicative of a word position within a given document that contains the word. The models used to score each of the words, in one embodiment, are generative models, while in another embodiment, discriminative models are used. These different types of scoring models are discussed in more detail below with respect to FIGS. 3A and 3B. In any case, scoring individual words in the documents to be summarized based on frequency and position information is indicated by block 154 in FIG. 2.

It will be noted that either frequency or word position information can be used in alternative embodiments, but in one illustrative embodiment, both types of information are used. Analysis component 104 thus outputs the documents to be summarized, along with the associated scores for the words in those documents. The scores and documents are indicated by block 116 in FIG. 1.

Generation component 106 illustratively includes sentence selection component 118 and optional sentence simplification component 120. In the embodiment shown in FIG. 1, sentence selection component 118 illustratively selects a set of sentences to summarize the document cluster based on the individual word scores for the words in those documents. Sentence selection component 118 generates potential summaries that are scored by giving them an overall score based on the scores of the content words included in the summary. The sentence selection component 118 then finds a summary with the best overall score. Selecting these sentences for generation that produce a best summary is indicated by block 156 in FIG. 2.

The sentences are then concatenated to form the summary and output by generation component 106 as summary 122 in accordance with one embodiment. In accordance with another embodiment, however, sentence simplification component 120 simplifies the sentences in the best scoring summary. This is indicated by block 158. The summary with the simplified sentences is then output as summary 122.

Sentence simplification is described in more detail below. Briefly, however, in order to simplify the sentences, phrases that have little or no expected value are removed. This makes room for additional sentences that provide more value. For instance, for each sentence in the document cluster, sentence simplification component 120 can eliminate different syntactic units based on predefined heuristic templates, such as by removing noun appositives, nonrestrictive relative clauses, or intrasentential attributions. In one embodiment, the best summary is chosen, and the sentences are simplified thereafter. In another embodiment, the simplified sentences do not replace the original sentences, but are instead added to the sentence pool for sentence selection component 118 to choose from. In any case, either the original sentences, or simplified sentences, or a combination of both, are selected and provided as summary 122.

Figure 3B:
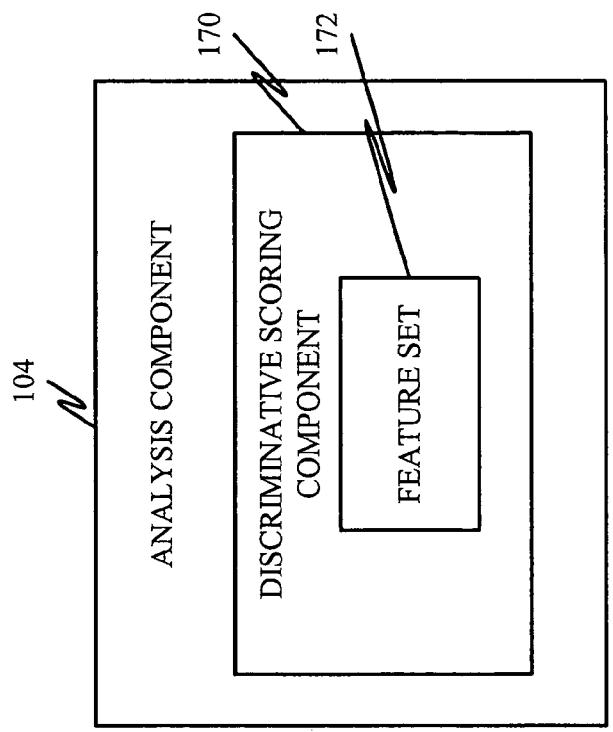
FIGS. 3A and 3B are more detailed block diagrams of the analysis component shown in FIG. 1.
Figure 3A:
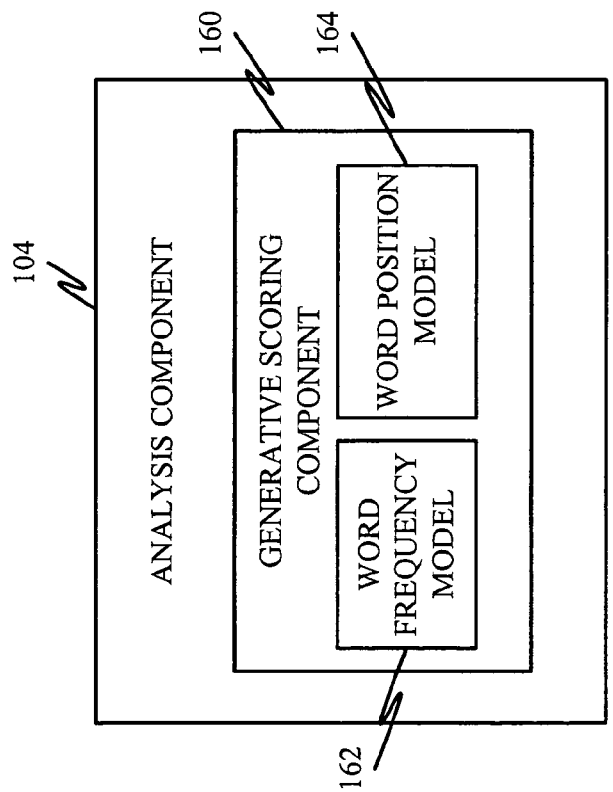

FIG. 3A illustrates a more detailed block diagram of one illustrative embodiment of analysis component 104. In the embodiment shown in FIG. 3A, analysis component 104 includes generative scoring component 160 that, itself, includes word frequency model 162 that scores words in the documents based on their frequency of occurrence, and word position model 164 that scores words in the documents based on their position within the individual documents in which they are contained.

Frequency model 162 illustratively selects tokens from the document cluster, and calculates a probability proportional to the frequency of the token in the cluster. This token is added to the summary and then all occurrences of the token are deleted from the cluster. This process is repeated until a summary is generated having the required length. Random sets of words do not form adequate clusters. Therefore, instead of simply choosing tokens, the summary comprises sentences with the highest probability according to the model, selected from the document cluster. Calculation of these scores is described in greater detail below with respect to FIG. 4.

Word position model 164 scores words based upon their position. It favors words that lie closer to the beginning of documents than to the end of the documents. For instance, in one illustrative embodiment, the words that reside in the first 100 words of a document are scored higher than the remaining words. In another embodiment, where the documents in the cluster are shorter, the words scored higher are those found in the first 50 words of the document.

In one embodiment, word position model 164 defines a position measure. For each word occurrence in a document cluster, its position relative to the beginning of its document is computed. A value of zero is given to the first word and a value of one for the last. For each word, the average of its occurrences throughout the document is then computed. For example, a very frequent word occurring randomly throughout the document has an average position of approximately 0.5. However, words that are disproportionately at the beginnings of documents have an average position of below 0.5.

In another embodiment, generative scoring component 160 combines models 162 and 164. This accommodates a tradeoff between overall frequency of tokens (or words) that are scored and the frequency of appearance of those tokens (or words) at the beginning of documents. By combining models 162 and 164, words are either selected at random from the entire document cluster, or only from the beginnings of the document cluster. The affected probability value is therefore a linear interpolation of the values used in the two base models 162 and 164.

FIG. 3B is an illustrative embodiment of analysis component 104. In FIG. 3B analysis component 104 includes a discriminative scoring component 170 that scores different words within the documents in the document cluster based upon a predetermined feature set 172. The discriminative scoring component 170 is trained to learn the probability that a given turn in a document will be in the summary. This is performed based on training data and the training process is described in greater detail later with respect to FIGS. 5 and 6. Suffice it to say, for now, that discriminative scoring component 170 is trained to learn whether a word is likely to appear in a summary based on the feature values for the features of the word in feature set 172.

In one illustrative embodiment, feature set 172 includes seven basic features that use frequency and word position information. These features are, of course, exemplary only. The first feature is the number of occurrences of the word in the document cluster. A second feature referred to as the occurrence ratio, is the first feature divided by the number of content words in the document cluster. A third feature is the average occurrence ratio which is calculated by calculating the occurrence ratio for each document in the cluster and averaging over all documents. A fourth feature is a minimum position feature which is calculated by finding the position (starting from zero) where the content word appears first in each document in the cluster, and using the smallest position value identified. The fifth feature is an average minimum position feature which is similar to the minimum position feature, but the average is used instead of the smallest value. If the content word does not appear in the document, the position is set to the total number of content words in the document. The sixth feature is the minimum relative position which is computed by computing the relative first position, which is the minimum position divided by the number of content words in the document, and returning the smallest of the cluster. The seventh feature is the average relative position feature which is similar to the minimum relative position feature but the average value over all documents in the cluster is used instead of the smallest.

These features are exemplary and additional or different features can be used as well. For instance, for each of the basic features, in one embodiment, the corresponding log feature can also be created. Suppose, for example, that the basic feature is X. Then, the corresponding log feature is $\log(1+X)$.

The feature set can then be expanded by introducing conjunction features. For instance, for each pair of the above features, the product of the values in the pair is defined as a new feature.

Figure 4:
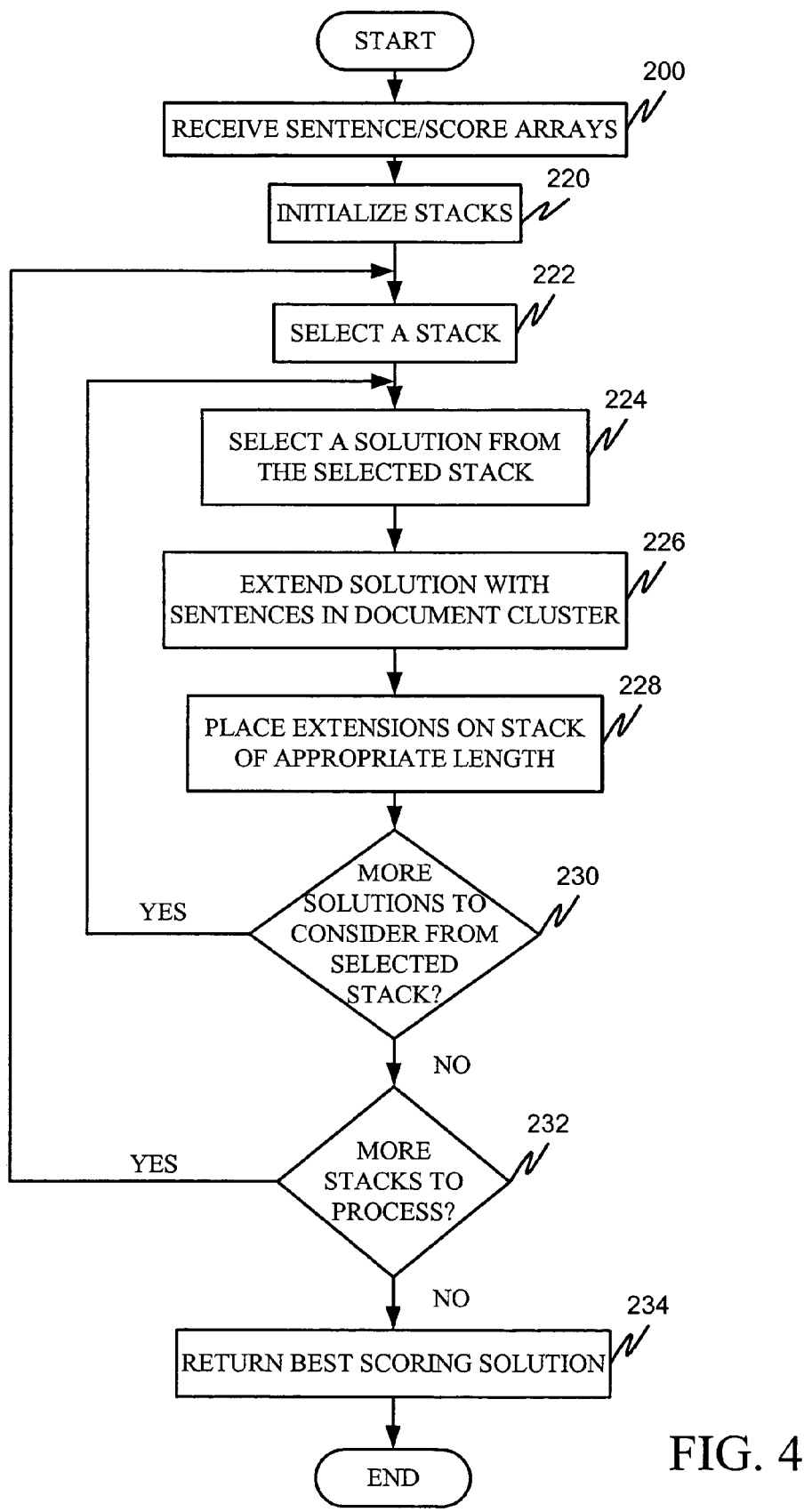
FIG. 4 is a flow diagram illustrating one illustrative embodiment of operation for sentence selection.

FIG. 4 is a flow diagram illustrating one illustrative embodiment of the operation of generation component 106 (shown in FIG. 1). A number of different approaches can be used for sentence selection component 118 in generating summary 122. For instance, a product-based approach can be used in which, for a given summary, the probability scores for each of the sentences are simply multiplied together. Finding the summary with the highest product of probabilities gives the summary with the highest probability of being exactly correct, according to that generative model.

In accordance with another embodiment, summaries are favored that have the most words that also appear in a reference summary (such as a human summary). If the score of a content word represents the probability that the word appears in the reference summary, then a summation of the scores for the words can be thought of as the expected number of "correct" content words in the summary.

The present discussion will proceed with respect to the summation of scores as the mechanism by which the best summary is found, although this is exemplary only. In the exemplary embodiment, the mechanism by which the best summary is found explicitly searches for the best combination of sentences in the summary. One exemplary embodiment of an algorithm used to perform such a search in implementing sentence selection component 118 is based on a stack decoder. One conventional difficulty when using stack decoders is that they have trouble comparing hypotheses of a specified length. This difficulty can be addressed using the known A* search algorithm, which requires finding an admissible cost function. However, the difficulty of comparing varying length hypotheses can also be addressed by using multiple stacks, with each stack representing hypotheses of a specified length, wherein there is a separate stack for all desired lengths. Table 1 below shows pseudocode for implementing a stack decoder as sentence selection component 118 in accordance with one embodiment. FIG. 4 is a flow diagram showing one embodiment of the overall operation of such a stack decoder.

TABLE 1

Algorithm 1 Stack Decoder for Multi-Document Summarization

1: INPUT: An array of Sentences[ ] and scores for each term in the Sentences[ ]
2: INPUT: A maximum length maxlength
3: INPUT: A maximum stacksize
4: TYPEDEF Solution = A variable length array of sentence IDs
5: Let stack[0..maxlength] be a priority queue of Solutions; each queue has at most stacksize Solutions.
6: stack[0] = the Solution of length 0;
7: for i = 0 to maxlength − 1 do
8:   for all sol ∈ Stack[i] do
9:     for all B ∈ Sentences do
10:       newlen = min i + length[B], maxlength
11:       newsol = sol ∪ {θ}
12:       score = score of newsol counting each word once, and at most maxlength words
13:       Insert newsol,score into queue stack[newlen], pruning if necessary
14:     end for
15:   end for
16: end for
17: Return best scoring solution in stack[maxlength]

When implemented as a stack decoder, sentence selection component 118 first receives as an input the set of all sentences from the document cluster to be summarized, as well as the score array used to weight the sentences, calculated by analysis component 104 and indicated by scores and documents 116 in FIG. 1. Receiving the sentence and score arrays is indicated by block 200 in FIG. 4.

The stacks are then initialized. Each of the stacks is a stack of length stacklength, one stack for each desired length, up to the maximum length maxlength of the summary. Each stack contains the best summaries calculated thus far, of exactly that length. The last stack, illustratively referred to as stack[maxlength] can contain summaries longer than maxlength, but words in excess of the maxlength are not considered in calculating the score. The stacks are also illustratively limited in the number of hypotheses in any given stack to a value stacksize. Initializing the stacks is indicated by block 220 in FIG. 4.

Next, sentence selection component 118 selects a stack and selects a solution from the selected stack. This is indicated by blocks 222 and 224, respectively, in FIG. 4. Component 118 proceeds by examining one particular stack (the selected stack) and looking at every solution on that stack wherein each solution is a set of sentences. Component 118 then attempts to extend that solution with every sentence from the document cluster. This is indicated by block 226 in FIG. 4. The extensions are then placed on the stack of the appropriate length. This is indicated by block 228 in FIG. 4.

In order to avoid an exponential increase in the number of solutions on any given stack, the stacks are illustratively implemented as priority queues. Therefore, only the top stacksize highest scoring solutions on any given stack are retained.

Component 118 then determines whether there are any more solutions to consider for the selected stack. This is indicated by block 230. If so, processing reverts back to block 224 where the next solution is selected from the stack. However, if, at block 230, there are no more solutions to consider from the selected stack, then component 118 determines whether there are more stacks to process. This is indicated by block 232 in FIG. 4. If so, processing reverts back to block 222 where the next stack is selected. If not, however, then component 118 simply returns the best scoring solution in the stack having a length of maxlength. This is indicated by block 234 in FIG. 4.

In accordance with one optional embodiment, generation component 106 also includes sentence simplification component 120. One goal may be to create a summarization system that produces summaries 122 with as much content as possible, and that satisfy the user. Since summaries are extractive, sentence simplification (also known as sentence shortening or sentence compression) can be viewed as a way of creating more space in the summary within which to capture important content.

One approach to sentence simplification is to shorten the sentences to be used in the summary deterministically. For example, one system incorporates a heuristic component for sentence simplification that pre-processes the sentences used in the sentence selection component. Another summarization system uses a syntactic simplification component, the results of which are sent to the sentence selection component. Further, post-processing to delete adverbs and attributive phrases can be helpful.

In these approaches, simplification operations apply to all sentences equally, and the core sentence selection component 118 has only either the original or the shortened sentence available to choose from. For this reason, simplification strategies are generally conservative, to avoid possible oversimplification. However, the best simplification strategy may not necessarily be the same for all sentences. For example, it may be desirable to delete material X from a sentence only if X is already covered by another sentence in the summary. Otherwise it should be retained.

An alternative approach to sentence simplification is to provide multiple shortened sentence candidates for the sentence selection component 118 to choose from. In one embodiment, sentence simplification is performed by applying a small set of heuristics to a parse tree to create alternatives, after which both the original sentence and (possibly multiple) simplified versions are available for selection. In this embodiment, original and alternative simplified sentences are provided for selection without differentiation, that is, without keeping any link between them.

Therefore, in one embodiment, the simplification component 120 includes heuristic templates for the elimination of syntactic units based on parser output. Each sentence in the document cluster is first parsed using a broad-coverage parser. Then a filter is run on the parse tree that eliminates certain nodes from the parse tree when the node matches the patterns provided heuristically. Table 2 lists some illustrative syntactic patterns that can be used.

TABLE 2

| Pattern | Example |
| --- | --- |
| Noun appositive | One senior, Liz Parker, had slacked off too badly to graduate. |
| Gerundive clause | The Kialegees, numbering about 450, are a landless tribe, sharing space in Wetumka, Okla., with the much larger Creek Nation, to whom they are related. |
| Nonrestrictive relative clause | The return to whaling will be a sort of homecoming for the Makah, whose real name which cannot be written in English means "people who live by the rocks and the seagulls." |
| Intra-sentential attribution | Separately, the report said that the murder rate by Indians in 1996 was 4 per 100,000, below the national average of 7.9 per 100,000, and less than the white rate of 4.9 per 100,000. |
| Lead adverbials and conjunctions | |

Figure 5:
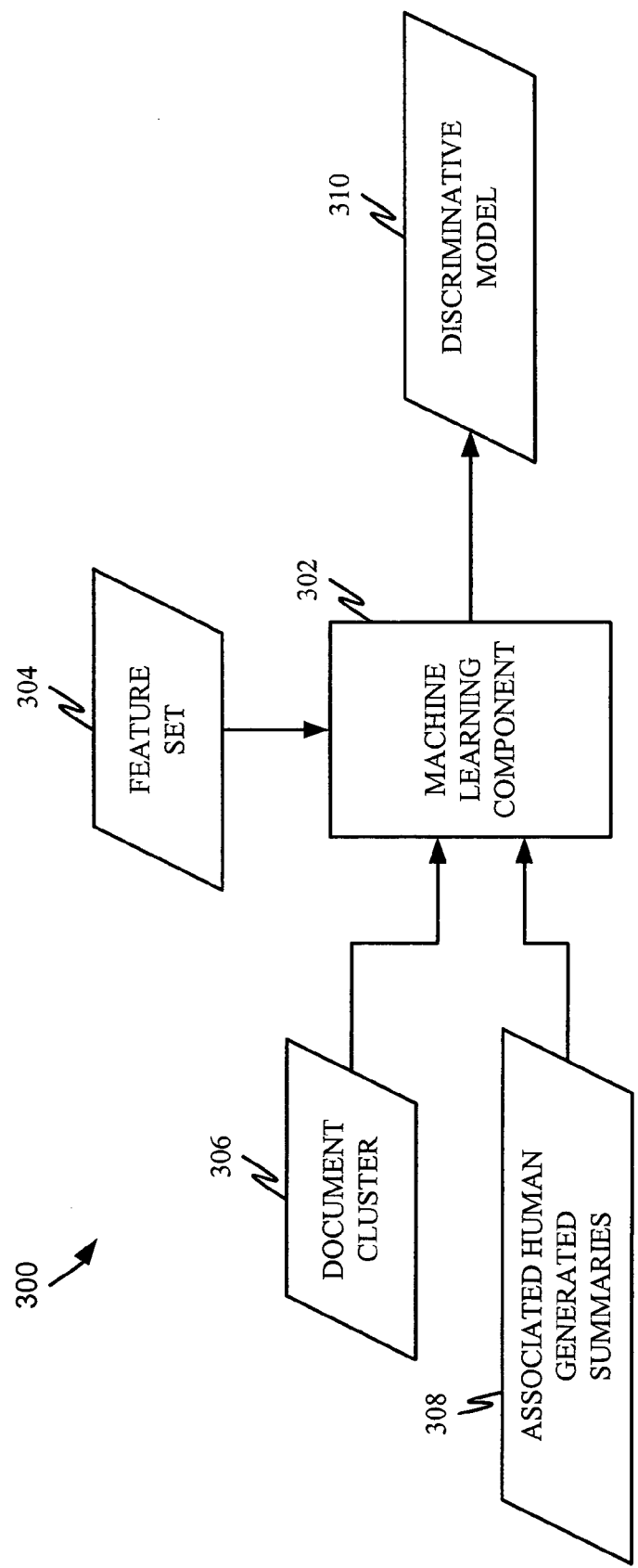
FIG. 5 is a block diagram of one illustrative machine learning system.
Figure 6:
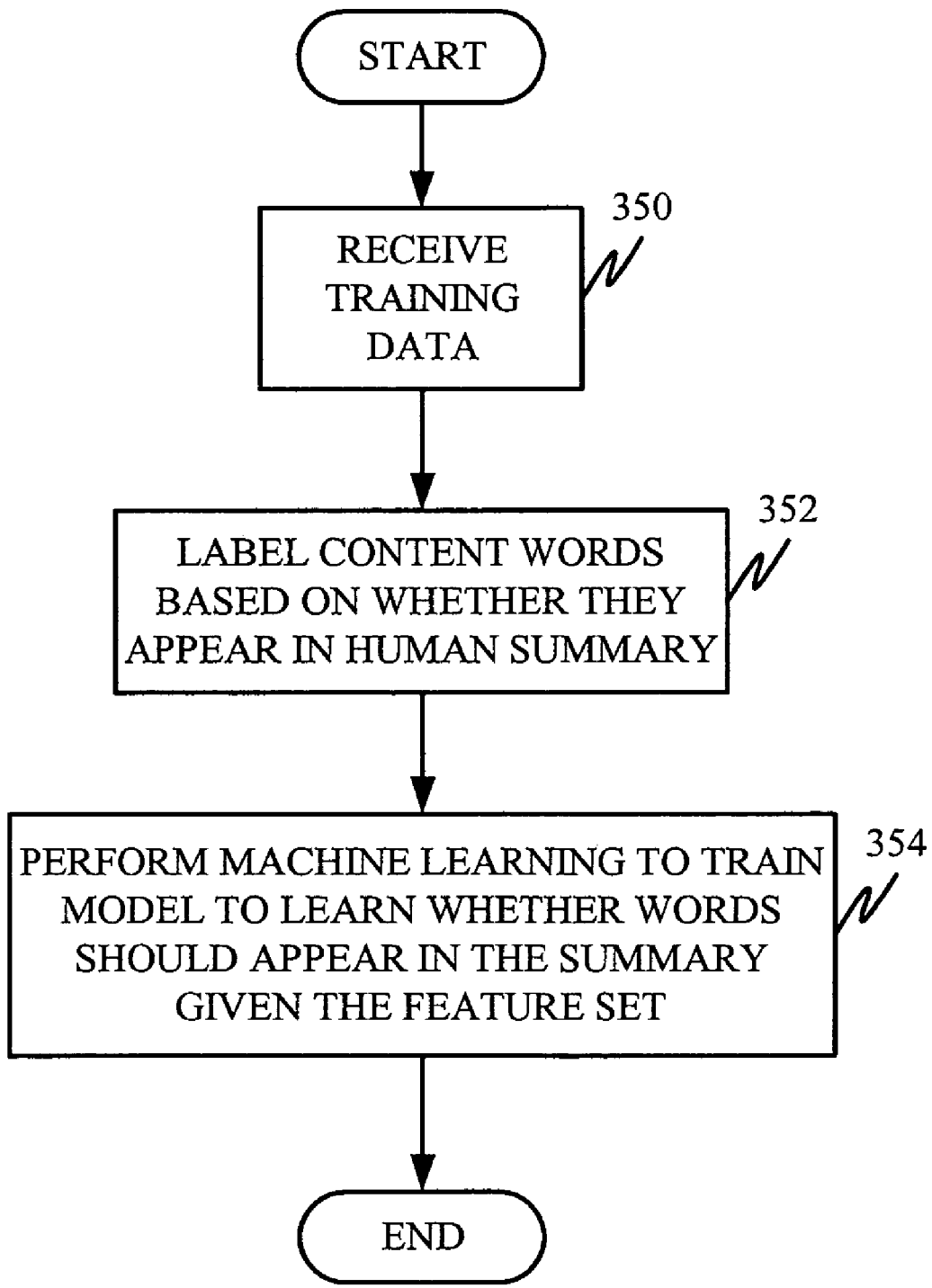
FIG. 6 is a flow diagram illustrating the operation of one illustrative machine learning system.

FIG. 5 is a block diagram illustrating one illustrative training system 300. FIG. 6 is a flow diagram illustrating one embodiment of the overall operation of system 300 shown in FIG. 5. System 300 illustratively includes a machine learning component 302 that has access to a feature set 304. Component 302 illustratively receives, as training data, a training document cluster 306 along with associated human generated (or other reference generated) summaries 308. Component 302 learns, based on the training data 306 and 308, what words are likely to belong in a summary, given the feature values for the feature set 304 corresponding to those words. Component 302 then trains discriminative model 310. In one illustrative embodiment, discriminative model 310 is used as discriminative scoring component 170 in analysis component 104 shown in FIG. 3B. Also, in one embodiment, feature set 304 corresponds to the features described above with respect to FIG. 3B. Of course, different or additional features could be used as well.

In any case, machine learning component 302 first receives training data 306 and 308. This is indicated by block 350 in FIG. 6. Component 302 then, for each content word in a document cluster 306, assigns a label of 1 to it if it appears in the corresponding reference summary 308 and otherwise assigns it a label of zero. Labeling the content words based on whether they appear in the reference summary is indicated by block 352 in FIG. 6. Machine learning component 302 then performs machine learning to learn the probability that the word (or token) has a label of 1 given its feature values for the features in feature set 304. This is indicated by block 354 in FIG. 6.

In one illustrative embodiment, machine learning component 302 implements, as a learning algorithm, a logistic regression algorithm. Logistic regression predicts probabilities directly (in contrast, for example, to perceptron training or support vector machines). In addition logistic regression works well even with inconsistent labels (in contrast, for example, to large margin approaches such as support vector machines which can find such data difficult to train on).

It will also be noted that, in one embodiment, there are a plurality of different reference summaries 308 for each document cluster 306 in the training data. When a given term in document cluster 306 only appears in, for instance, three out of four of the reference summaries 308, then the training data will have four identical feature vectors representing that given term. Three of them will be labeled one and the other will be labeled zero. The remaining features in the feature set for each given word are calculated as described above with respect to FIG. 3B.

Figure 7:
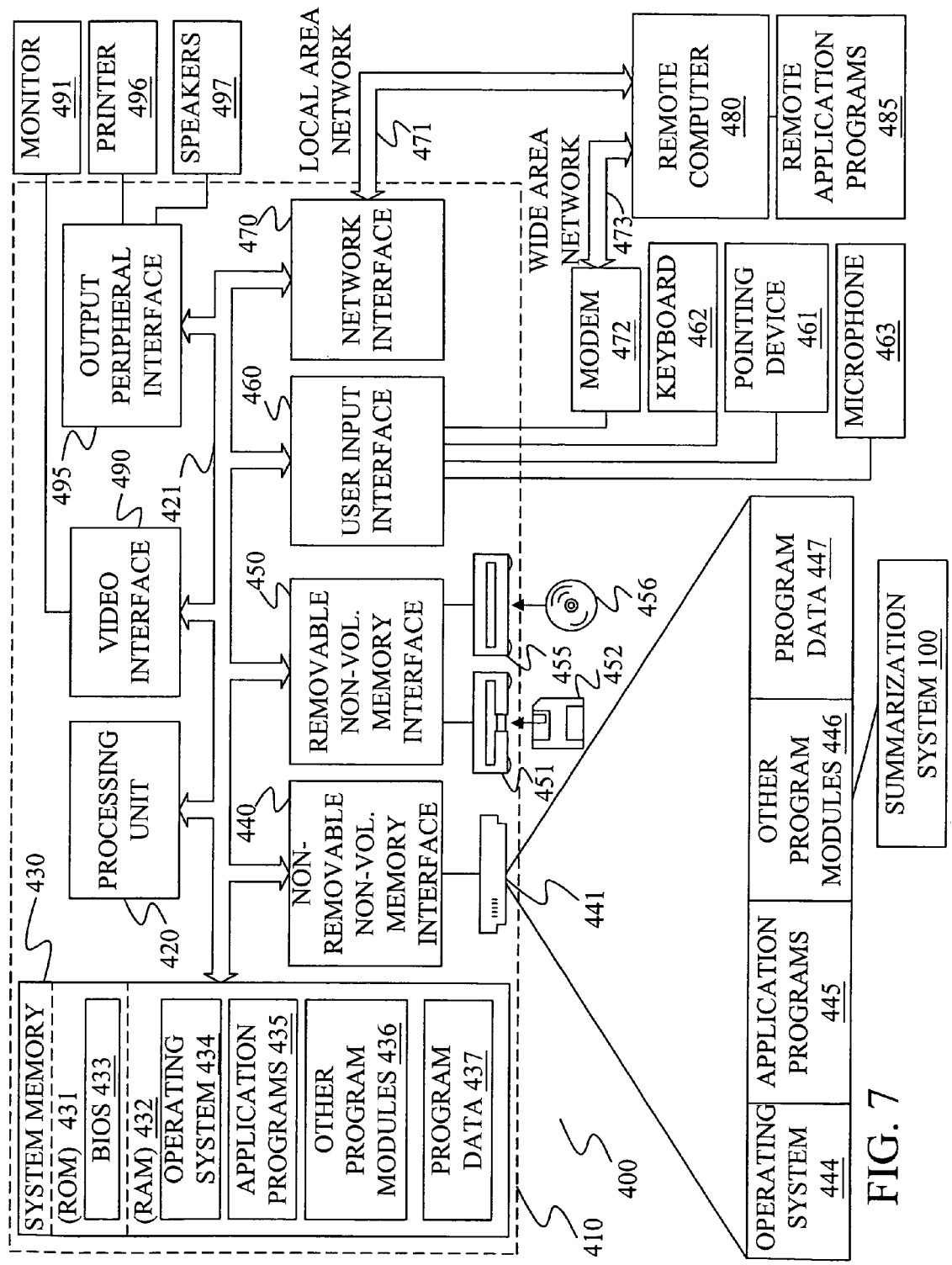
FIG. 7 is a block diagram of one illustrative computing environment.

FIG. 7 illustrates an example of a suitable computing system environment 400 on which embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 7 illustrates operating system 434, application programs 435, other program modules 436, and program data 437.

The computer 410 may also include other removable/non-removable volatile/nonvolatile computer storage media. By way of example only, FIG. 7 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 7, provide storage of computer readable instructions, data structures, program modules and other data for the computer 410. In FIG. 7, for example, hard disk drive 441 is illustrated as storing operating system 444, application programs 445, other program modules 446, and program data 447. Summarization system 100 is shown in FIG. 7 as residing in other program modules 446, but it could reside in other memory or elsewhere as well, including a variety of places, such as on a remote computer 480. Note that these components 444, 445, 446 and 447 can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 7 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 7 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A document summarization system including components stored on a computer storage medium for execution by a computing device, comprising:
    a preprocessing component that preprocesses one or more documents identifying words and sentences;
    an analysis component scoring only a first occurrence of individual words in a document using a word position component based on word position information indicative of a position of the words relative to the beginning of the one or more documents and using a frequency component based on frequency information indicative of a frequency of occurrence of the individual words in the one or more documents, the word position component increasing as the word position for a given word is closer to the beginning of a document in which the given word occurs and the frequency component for the given word increasing with frequency of occurrence of the given word within the document; and
    a generation component including a stack decoder that has stacks of possible summaries of different lengths, each stack having one or more summaries of the same length, the generation component selecting sentences from the one or more documents for addition to the possible summaries to form a summary based on the scores of the individual words in the selected sentences by generating summary hypotheses each of which include a set of selected sentences, the sentences being selected using an optimization scheme that directly maximizes a sum of the scores of the individual words in the selected sentences up to a word length threshold indicative of a maximum number of words to be included in the sum of the scores, the summary comprising the summary hypothesis with a highest sum of the scores of the individual words in the summary hypothesis.

2. The system of claim 1 and further comprising:
    a syntactic analysis component configured to shorten or rephrase sentences selected by or to be supplied to the generation component.

3. The system of claim 1 wherein the analysis component comprises:
    a model trained using a discriminative machine learning method, using features that use the word frequency and word position information.

4. The system of claim 1 wherein the analysis component comprises:
    a model configured to assign scores to the individual words based on the word frequency and position information.

5. The system of claim 4 wherein the model comprises a generative probabilistic model.

6. The system of claim 1 and further comprising:
    a part-of-speech tagger configured to assign part-of-speech tags to the individual words, the analysis component being configured to only score individual words with predefined part-of-speech tags.

7. The system of claim 3 wherein the machine learning component is trained to learn a score based on whether a word appears in a reference generated summary.

8. A document summarization system stored on a computer storage system for summarizing one or more documents, comprising:
    a machine learning component that learns for individual words in the one or more documents a score indicative of whether the individual words likely occurs in a reference generated summary previously created for training purposes and based on word position information indicative of a position of the individual words in the one or more documents, and frequency information indicative of a frequency of occurrence of the individual words in the one or more documents; and
    a generation component including a stack decoder that selects sentences from the one or more documents to form possible summaries of different lengths based on the score of the individual words, each stack has one or more summaries of the same length, wherein the generation component selects sentences for inclusion in the possible summaries by generating a plurality of summary hypotheses by using optimization scheme that directly maximizes a sum of the scores of the individual words in the selected sentences in each summary hypothesis for only words in each summary hypothesis that are within a maximum length threshold indicative of a maximum number of words to be scored for the summary hypothesis.

9. The system of claim 8 wherein the generation component includes a syntactic analysis component and is configured to simplify sentences selected by or to be supplied to the generation component based on analysis by the syntactic analysis component.

10. A document summarization system stored on a computer storage system that summarizes one or more documents, comprising:
    a scoring component receiving the one or more documents with sentence and word boundaries identified and scoring individual words in sentences based on position information indicative of a position of the individual words within the one or more documents and based on frequency information indicative of a frequency of occurrence of the words within the one or more documents; and
    a generation component comprising a stack decoder that has stacks of possible summaries of different lengths from which a summary is to be selected, with each stack having one or more possible summaries of the same length, the generation component selecting sentences for addition to the possible summaries from the one or more documents to form a summary based on the scores of the individual words in the sentences using an optimization scheme that directly maximizes a score of the summary based on a sum of the scores for a number of words in the summary up to a maximum word threshold.

11. The system of claim 10 and further comprising:
    a preprocessor configured to identify the word and sentence boundaries in the one or more documents.

12. The system of claim 10 and further comprising:
    a sentence simplification component configured to shorten or rephrase sentences selected by or to be supplied to the generation component by performing a syntactic analysis on the sentences.

13. The system of claim 10 and further comprising:
    a part-of-speech tagger configured to identify parts-of speech of the individual words.

* * * * *